(12) United States Patent
Chang

(10) Patent No.: US 6,694,528 B1
(45) Date of Patent: Feb. 24, 2004

(54) LAMINATED ASSEMBLY SEAM OF OUTDOOR GARMENT AND PROCESS OF MAKING SAME

(75) Inventor: Yung Sheng Chang, Taipei (TW)

(73) Assignee: J. Adams & Associates Limited, Taipei (TW)

( * ) Notice: Subject to any disclaimer, the term of this patent is extended or adjusted under 35 U.S.C. 154(b) by 0 days.

(21) Appl. No.: 10/414,901

(22) Filed: Apr. 16, 2003

(51) Int. Cl.⁷ .............................. A41D 13/00; B32B 7/08
(52) U.S. Cl. ............................. 2/275; 2/243.1; 112/418
(58) Field of Search ......................... 2/275, 96, 273.1, 2/82, DIG. 5, 69, 77, 79, 80, 85, 87, 93, 102, 106, 108, 115, 121, 122, 266; 156/93; 112/418, 441, 406, 475.09, 475.16; 428/53, 57, 58, 77, 78, 411.1, 911

(56) References Cited

U.S. PATENT DOCUMENTS 3,090,047 A * 5/1963 De Grazia ..................... 2/275
3,449,764 A * 6/1969 De Fazio et al. ................ 2/96
4,604,152 A * 8/1986 Liukko ........................ 156/93
5,003,902 A * 4/1991 Benstock et al. ........... 112/418
5,444,898 A * 8/1995 Norvell ........................ 24/389

* cited by examiner

Primary Examiner—Gloria M. Hale
(74) Attorney, Agent, or Firm—Ladas & Parry

(57) ABSTRACT

Disclosed is a laminated assembly seam for an outdoor garment in accordance with the present invention, comprising: a top panel having a panel body with at least one folded edge; a bottom panel having a panel body with at least one seam edge, the seam edge being positioned below and extending beyond the folded edge of the top panel; a narrow thermally meltable compound sandwiched between the top panel body and the folded edge; a wide thermally meltable compound placed above the seam edge of the bottom panel and sandwiched between the folded edge and the seam edge of the bottom panel; a stitching line stitching through the seam edge of the bottom panel, the wide meltable polyurethane resin, the folded edge of the top panel and the narrow thermally meltable polyurethane resin without stitching through the top panel body of the top panel.

10 Claims, 2 Drawing Sheets

US 6,694,528 B1

LAMINATED ASSEMBLY SEAM OF OUTDOOR GARMENT AND PROCESS OF MAKING SAME

CROSS-REFERENCES TO RELATED APPLICATIONS

Not Applicable

STATEMENT REGARDING FEDERALLY SPONSORED RESEARCH OR DEVELOPMENT

Not Applicable

DESCRIPTION

1. Field of the Invention

The present invention relates to a laminated assembly seam of an outdoor garment that has a stitch-free appearance while eliminating the need for laser cutting or bulk die cutting machines, and to a process of making such laminated assembly seam.

2. Description of the Related Art

FIGS. 1 and 2 show a conventional outdoor garment. To ensure the waterproofing effect along the assembly seam, the neighbouring panels, A and B, are stitched together at J, and a thermal tape T is placed underneath the stitching line J on a PU impregnated side, so as to seal the stitching holes.

With the wide application of laminating techniques, an improved process of laminating the neighboring panels to join the seam together by using a thermally meltable compound G, such as a thermally meltable polyurethane resin, instead of stitching J, has been developed, as shown in FIG. 3, for adhering the seam of two neighbouring panels, A and B, together. Adoption of such a technique results in a clean and neat outer for the outdoor garment, by eliminating the messy stitching lines, and thus increases the commercial value and appeal of such laminated seam garments. However, the laminating techniques also require the use of laser cutting machines or bulk die cutting machines to cut the panels, and the additional process of burning the edges so as to ensure that the edges are free from fraying after washing, thereby reducing the production efficiency. Further, specialized molds each having exactly the same shape of each panel, are required for thermally pressing the laminated seams so as to ensure that the thermal meltable polyurethane resin G will properly join the two neighboring panels along the seam without any mess. Such specialized molds are expensive and the cost increases as the number of panels that need to be joined to make a garment increases.

Furthermore, while the waterproof fabric usually consists of a shell made of nylon with a PU or PTFE backing layer, the adhesion force between the nylon shell and the PU backing is usually less than 0.40 kg/cm, because a higher adhesion force renders stiffness. The laser cutting process, while providing a clean edge, fails to reinforce the adhesion force. On the contrary, the thermally meltable polyurethane resin provides a higher adhesion force between the backing layer of the upper panel and the nylon shell of the lower panel. Hence, another major drawback of such a laminated assembly seam is the high tendency of separation of the nylon shell of the outer panel from its backing layer.

BRIEF SUMMARY OF THE INVENTION

An objective of the present invention is to provide a laminated assembly seam of an outdoor garment that has a stitch-free appearance.

Another objective of the present invention is to provide a laminated assembly seam of an outdoor garment that eliminates the need for laser cutting or bulk die cutting machines.

Another objective of the present invention is to provide a laminated assembly seam of an outdoor garment that eliminates the separation of the nylon shell of the outer panel from its backing layer.

A further objective of the present invention is to provide a process of making such a laminated assembly seam have the advantages as described above.

To achieve these objectives, the laminated assembly seam of an outdoor garment in accordance with the present invention comprises: a top panel having a panel body with at least one folded edge; a bottom panel having a panel body with at least one seam edge; the seam edge positioned below and extending beyond the folded edge of the top panel. A narrow thermal meltable compound is sandwiched between the top panel body and the folded edge. A wide thermally meltable compound is placed above the seam edge of the bottom panel and sandwiched between the folded edge and the seam edge of the bottom panel. A stitching line stitching through the seam edge of the bottom panel, the wide meltable polyurethane resin, the folded edge of the top panel and the narrow thermal meltable polyurethane resin without stitching through the body of the top panel.

The structure and objectives of the present invention can be more readily understood by persons skilled in the art from the following description of the preferred embodiments taken in conjunction with the accompanying drawings.

DETAILED DESCRIPTION OF THE INVENTION

Figure 1:
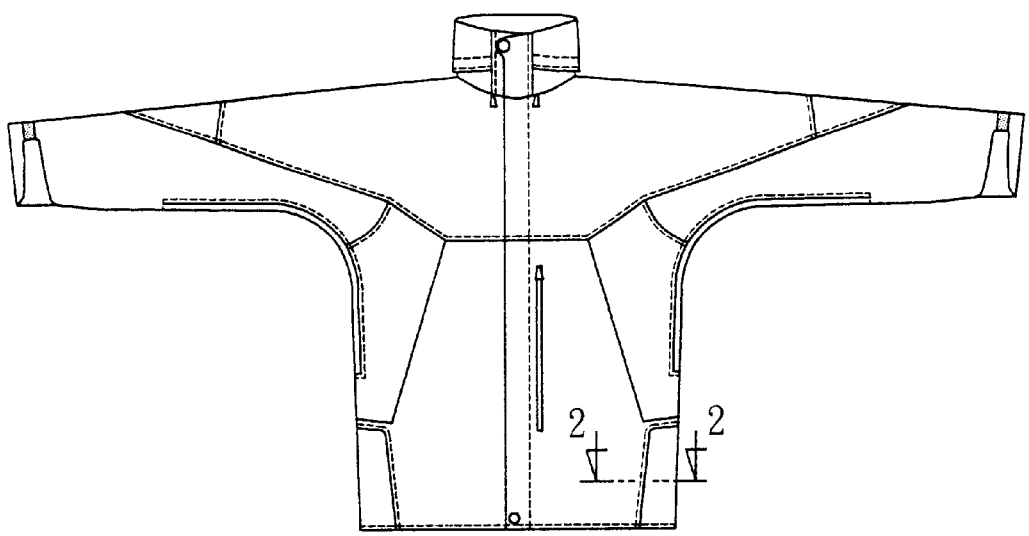
FIG. 1 is a front elevation view of a conventional outdoor garment.
Figure 2:
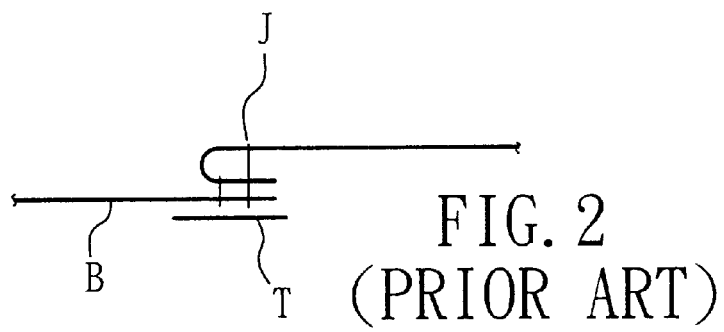
FIG. 2 is a cross-sectional view taken along Lines 2—2 in FIG. 1.
Figure 3:
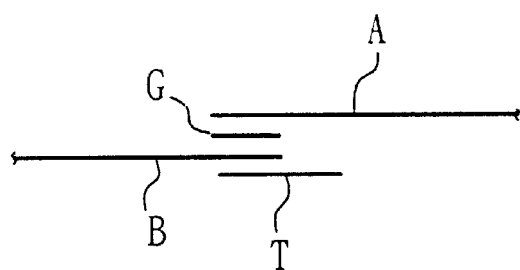
FIG. 3 is a cross-sectional view of a common, laminated assembly seam.
Figure 4:
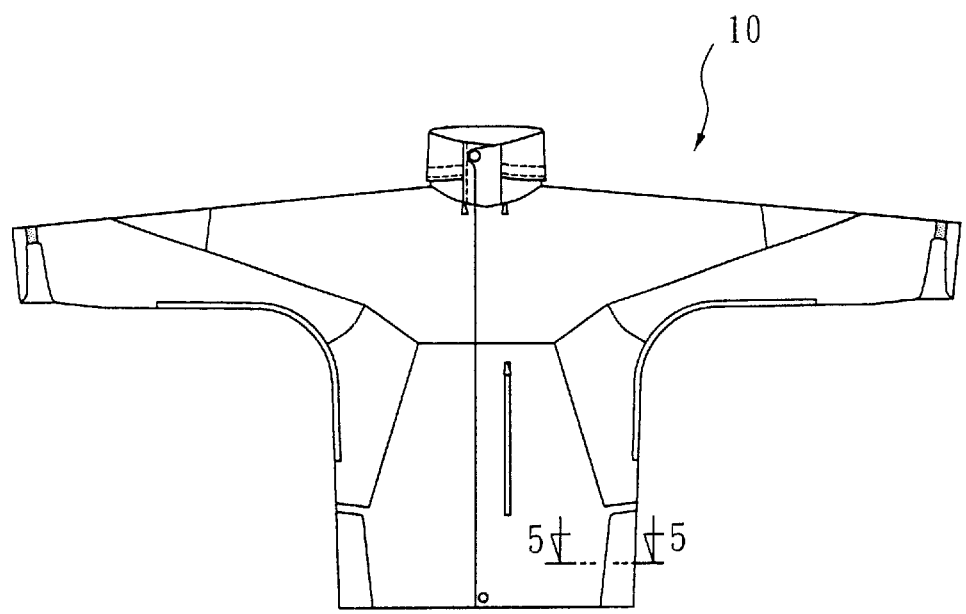
FIG. 4 is a front elevation view of an outdoor garment assembled in accordance with the present invention.
Figure 5:
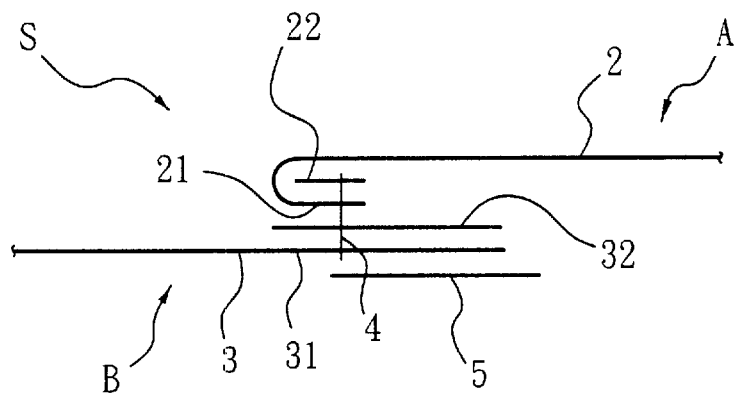

FIGS. 4 and 5 show the outdoor garment with a laminated assembly seam in accordance with a preferred embodiment of the present invention. As shown, the outdoor garment 10 is made by joining several neighboring panels.

FIG. 5 is a cross-sectional view taken along Lines 5—5 in FIG. 4, illustrating the seam S between a two neighboring panels.

The laminated assembly seam S in accordance with the preferred embodiment of the present invention comprises: a top panel A having a top panel body 2 and at least one folded edge 21; a bottom panel B having a bottom panel body 3 with at least one seam edge 31, the seam edge 31 being positioned below and extending beyond the folded edge 21 of the top panel A; narrow thermal meltable compound 22 (such as a thermally meltable polyurethane resin in the form of a glue film) sandwiched between the top panel body 2 and the folded edge 21; a wide thermally meltable compound 32 (such as thermally meltable polyurethane resin in the form of a glue film) is placed above the seam edge 31 of the bottom panel B and sandwiched between the folded edge 21 and the seam edge 31 of the bottom panel B; a stitching line 4 stitching through the seam edge 31 of the bottom panel B, the wide meltable polyurethane resin 32, the folded edge 21 of the top panel A and the narrow meltable polyurethane resin 22 without stitching through the top panel body 2 of the top panel A.

Preferably, a thermal tape 5 may be added below the bottom panel B along the stitching line 4 to enhance waterproofing.

Based on the above structure, by using a thermal welding machine to heat the thermally meltable compounds, 22 and 32, and the thermal tape 5, the molten and then cured compounds, 22 and 32, will adhere the folded edge 21 to the top panel body 2 and to the seam edge 31 along the stitching line 4, respectively; the molten and then cured compound 32 will also adhere the top panel body 2 to the seam edge 31 within a region where the seam edge 31 extends beyond the folded edge 21 of the top panel A. As such, the seamless front panel assembly in accordance with a preferred embodiment of the present invention is constructed.

To further improve waterproofing, the panels, A and B, may be made of woven or knit man-made fabric (such as nylon, polyester, TC, CN), or impregnated fabrics (such as PU, PTFE, PVC, or rubber coated/laminated fabrics). However, it should be noted that while applying the present invention to other types of garments, the fabrics for the garment's outer shell can also be non-impregnated, especially highly breathable fabrics, which makes the garment fashionable with a neat seamless outer appearance.

A preferred embodiment for the process of making the laminated assembly seam S in accordance with the present invention is described as follows:

1) Placing a wide thermally meltable compound in the form of a glue film above and along a periphery of the outer side of a bottom panel.
2) Placing a top panel, having a shell side and a backing side, above the wide thermally meltable compound with the shell side facing the thermally meltable compound and maintaining a distance between an edge of the top panel and an edge of the bottom panel.
3) Placing a narrow thermal tape in the form of a glue film above and along a periphery of the top panel.
4) Stitching through the narrow thermal tape, the top panel, the wide thermal tape, and the bottom panel along the narrow thermal tape.
5) Folding the top panel back along the narrow thermal tape to form a sub-assembly.
6) Heat pressing the top panel along the fold with a thermal pressing machine.
7) Placing the sub-assembly above a thermal tape with the thermal tape located beneath the stitching line.
8) Heat pressing the bottom panel along the thermal tape with a thermal pressing machine.

Because the laminated assembly seam S in accordance with the present invention is provided with at least one folded edge 21 along the top panel A, the folded edge 21 provides a stitch-free appearance. Furthermore, it is no longer necessary to apply laser cutting machines or bulk die cutting machines to cut the panels and the additional process of burning the edges because the folded edge 21 already ensures that the edge is free from fraying after washing.

Generalized molds for heat pressing the glue films are sufficient for joining the two neighboring panels because multiple heat pressing along the seam will not result in a messy appearance as the stitching line ensures a proper joint between the two panels.

At the same time, the stitching line 4 that lies underneath the top panel body 2 provides sufficient strength between the top panel A and the bottom panel B so as to eliminate the possible separation of the nylon shell of the upper panel from its backing layer as found in previous processes.

The structure of the present invention is not limited to the above embodiments. Although the invention has been described with reference to the preferred embodiments, it will be obvious to persons skilled in the art that various changes and modifications may be made without departing from the scope of the invention as recited in the claims.

What is claimed is:

1. A laminated assembly seam for a garment comprising:
   a top panel, having a top panel body with at least one folded edge;
   a bottom panel, having a bottom panel body with at least one seam edge, the seam edge being positioned below and extending beyond the folded edge of the top panel;
   a narrow thermally meltable compound, sandwiched between the top panel body and the folded edge;
   a wide thermally meltable compound, placed above the seam edge of the bottom panel and sandwiched between the folded edge and the seam edge of the bottom panel; and
   a stitching line stitching through the seam edge of the bottom panel, the wide thermally meltable compound formed of polyurethane resin, the folded edge of the top panel and the narrow thermally meltable compound formed of polyurethane resin without stitching through the top panel body of the top panel.

2. The laminated assembly seam for a garment according to claim 1, further comprising a thermal tape provided below the bottom panel along the stitching line.

3. The laminated assembly seam for a garment according to claim 2, wherein the thermally meltable compound is heated by a thermal welding machine to form the seam.

4. The laminated assembly seam for a garment according to claim 3, wherein the thermally meltable compound is a thermally meltable polyurethane resin in the form of a glue film prior to heating.

5. The laminated assembly seam for a garment according to claim 3, wherein the narrow thermally meltable compound adheres the folded edge to the top panel body, and wherein the wide thermally meltable compound adheres the folded edge to the seam edge along the stitching line and the top panel body to the seam edge within a region where the seam edge extends beyond the folded edge of the top panel.

6. The laminated assembly seam for a garment according to claim 1, wherein the top and bottom panels are impregnated woven fabric.

7. The laminated assembly seam for a garment according to claim 1, wherein the top and bottom panels are non-impregnated woven fabric.

8. A process of making a laminated assembly seam for a garment, comprising the steps of:
   a. placing a wide thermally meltable compound in the form of a glue film above and along a periphery of outer shell side of a bottom panel;
   b. placing a top panel having a shell side and a backing side, above the wide thermally meltable compound with the shell side facing the thermally meltable compound and maintaining a distance between an edge of the top panel and an edge of the bottom panel;
   c. placing a narrow thermal tape in the form of a glue film above and along a periphery of the top panel;

d. stitching through the narrow thermal tape, the top panel, the wide thermal tape, and the bottom panel along the narrow thermal tape;

e. folding the top panel back along the narrow thermal tape to form a sub-assembly;

f. heat pressing the top panel along the fold with a thermal pressing machine.

9. The process of making a laminated assembly seam for a garment according to claim 8, further comprising the steps of: placing the sub-assembly above a thermal tape with the thermal tape located beneath the stitching line; and heat pressing the bottom panel along the thermal tape with a thermal pressing machine.

10. A garment comprised of several neighboring panels, wherein at least two of the neighboring panels are joined by the laminated assembly seam according to claim 1.

* * * * *